Sept. 1, 1953   P. DURKIN   2,650,679
GROUND BRAKE
Filed Jan. 14, 1952   4 Sheets-Sheet 1

Patrick Durkin
INVENTOR.

Sept. 1, 1953 P. DURKIN 2,650,679
GROUND BRAKE

Filed Jan. 14, 1952 4 Sheets-Sheet 2

Patrick Durkin
INVENTOR.

BY

Sept. 1, 1953 P. DURKIN 2,650,679
GROUND BRAKE
Filed Jan. 14, 1952 4 Sheets-Sheet 3

Patrick Durkin
INVENTOR.

BY Clarence A O'Brien
and Harvey B. Jacobson
Attorneys

Sept. 1, 1953 P. DURKIN 2,650,679
GROUND BRAKE
Filed Jan. 14, 1952 4 Sheets-Sheet 4
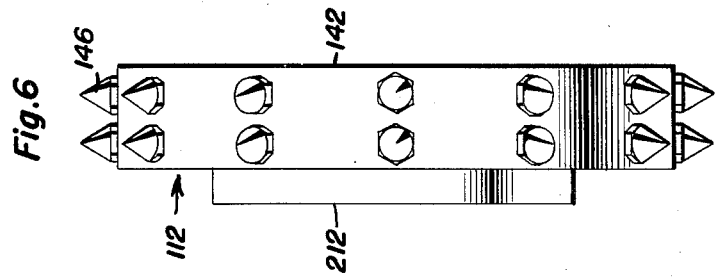
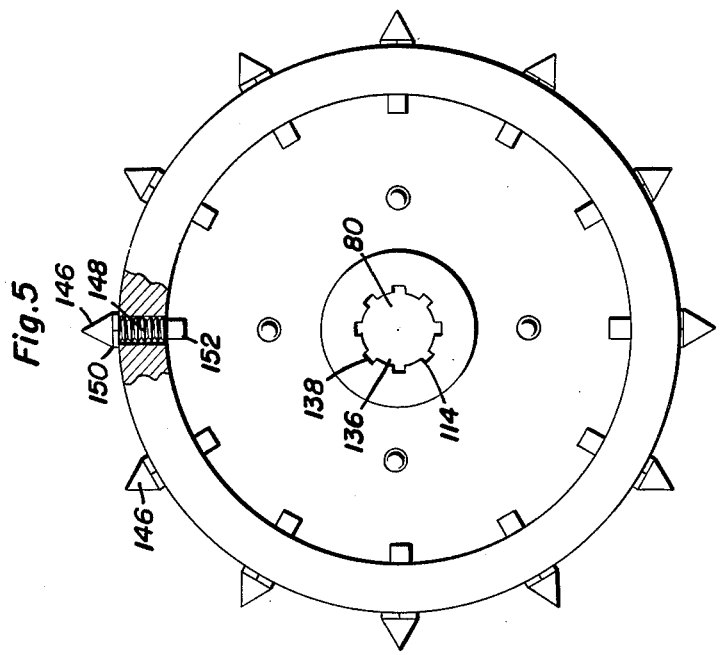
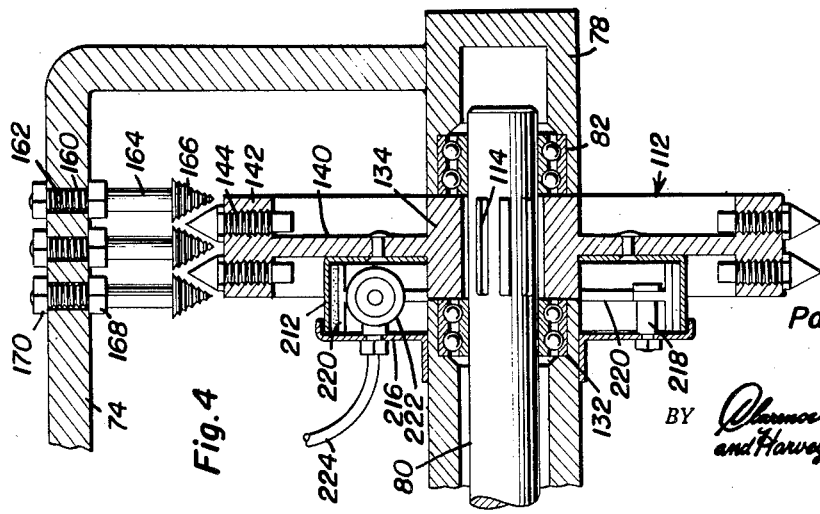
Patrick Durkin
INVENTOR.

Patented Sept. 1, 1953

2,650,679

UNITED STATES PATENT OFFICE 2,650,679

GROUND BRAKE

Patrick Durkin, Chicago, Ill.

Application January 14, 1952, Serial No. 266,308

9 Claims. (Cl. 188—5)

This invention relates to a ground brake and particularly to an auxiliary braking equipment pivotally mounted to the rear of a self-propelled vehicle and having means for assisting either in braking or propelling the vehicle.

When driving automotive vehicles on slippery surfaces such as mud or ice considerable difficulty is experienced because of the reduced traction between the tires and the surface. The reduced traction frequently results in inability of the vehicle to climb hills or to get started on a slippery surface. Likewise, the lack of traction prevents stopping when an emergency occurs.

The present invention relates to a ground brake or propeller which is adapted to be pivotally mounted on the rear end of a motor vehicle and lowered into contact with the slippery surface to aid in propelling or stopping the car as the case may be. The construction according to the present invention comprises a frame hingedly connected on the rear axle of the automotive vehicle and having elevating means for oscillating the frame into or out of engaging position with the ground where ground engaging wheels are provided with calks for firm engagement with the slippery surface.

It is an object of this invention to provide an improved braking device.

It is a further object of this invention to provide a brake which may be moved into and out of ground engagement.

It is a further object of this invention to provide a ground engaging device which may be utilized either to stop or propel a vehicle.

It is a further object of this invention to provide a brake having positive engagement with a slippery surface.

Other objects and many of the attendant advantages of this invention will be apparent from the following detailed description taken in conjunction with the accompanying drawing in which:

Figure 4 is an enlarged vertical section showing the section and mounting of the ground contacting element;

Figure 5 is an enlarged end view of the ground wheel showing the mounting of the calks; and Figure 6 is an enlarged elevation of the ground wheel.

Figure 1:
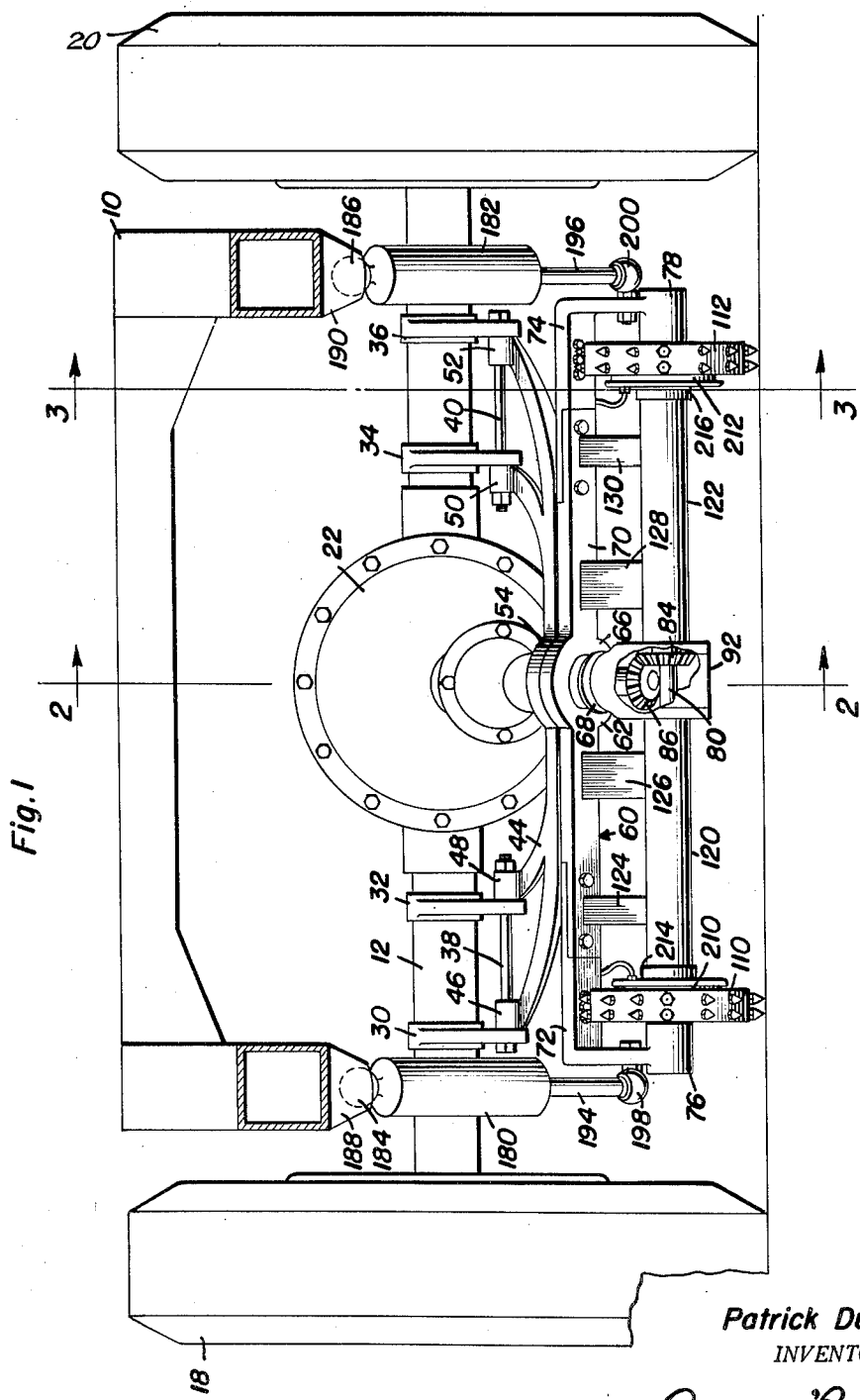
Figure 1 is a rear elevation of the ground brake applied to a vehicle with portions of the vehicle broken away and in section.
Figure 2:
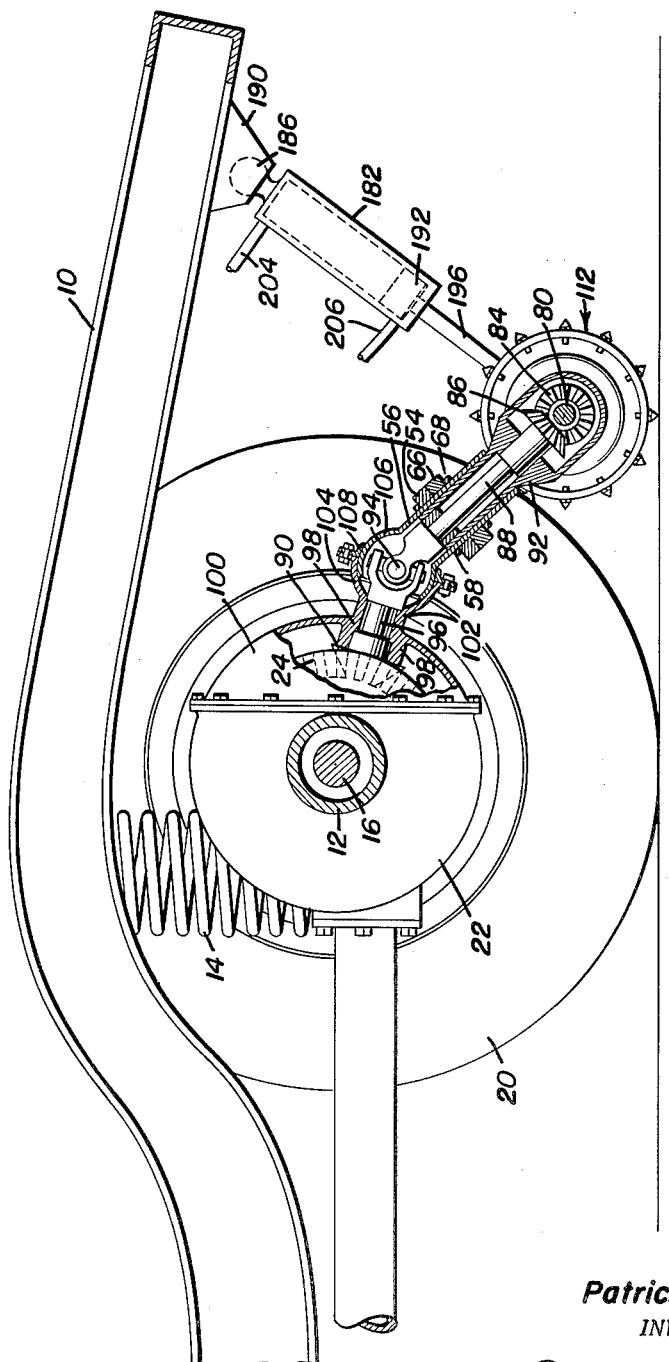
Figure 2 is a cross-section showing a driving mechanism for the brake and taken substantially on the plane indicated by the line 2—2 of Figure 1.

In the exemplary embodiment of the invention a vehicle frame 10 is supported above a rear axle housing 12 by means of springs 14. The axle housing 12 has a pair of axles 16 therein on which are mounted the driving wheels 18 and 20. The rear axle housing 12 is provided with the usual gear casing 22 and in which is mounted the usual driving gears 24; all of this construction being conventional.

A plurality of brackets 30, 32, 34 and 36 are mounted on the rear axle 12 and extend rearwardly therefrom. Pivot rods 38 and 40 are mounted in the brackets 30 and 32 and 34 and 36 respectively. A frame 44 has journals 46 and 48 mounted on the pivot rod 38 and journals 50 and 52 mounted on the pivot rod 40. The frame 44 is therefore journaled about the pivot rods 38 and 40 so that it is oscillatable about an axis defined by the pivot rods 38 and 40 so that it oscillates about an axis substantially parallel to the housing 12. The frame 44 is provided at the central portion thereof with an enlarged annular bushing 54. A hollow shaft 56 extends through the bushing 54 and is rigidly connected thereto by suitable means such as welding 58.

A U-shaped frame 60 is provided with a central annular bearing 62 which is rotatably mounted on the hollow shaft 56 and is retained thereon by means of a collar 63. The U-shaped frame 60 is provided with a central portion 70 and angulated end portions 72 and 74, the end portion 72 being provided with a bearing 76 while the end portion 74 is provided with a bearing 78. A shaft 80 is mounted in the bearing housing 76 and 78 by means of roller bearings 82. The central portion of the shaft 80 is provided with a gear 84 which engages a gear 86 which is mounted on a drive shaft 88 which has a gear 90 in driving engagement with the drive gear 24. The shaft 88 is mounted in the tubular connector 56 in a housing 92. Intermediate the ends of the shaft 88 is a universal joint 94; the axis of the universal joint 94 being in the axis of the pivot pins 38 and 40 so that the shaft 88 may move with the U-shaped frame 60 and the mounting frame 44.

The upper end 96 of the shaft 88 is journaled in a bearing 98 formed in the closure plate 100 of the housing 22. The closure plate 100 is provided with an extension housing 102 having a flared ball socket 104 in which is mounted a ball 106 of the hollow shaft 56. A closure ring 108 keeps the ball 106 in the socket 104.

Mounted on the shaft 80 preferably adjacent the bearing housing 76 and 78 are ground engaging wheels 110 and 112. The wheels 110 and 112 are preferably rigidly secured to the shaft by any suitable means such as the splined joint 114. That portion of the shaft 80 between the wheels 110 and 112 and the housing 92 is provided with a housing having two sections 120 and 122. The housing 120 is rigidly connected in non-rotative relation to the central portion 70 of the U-shaped frame by means of extending brackets 124 and 126 while a portion of the housing 122 is connected to the central portion 70 by brackets 128 and 130. Preferably the portions of the shaft are connected to the shaft 80 by means of suitable bearings 132. Wheels 110 and 112 are each provided with a central hub 134 which is provided with splines 136 which engage the splines 138 of the shaft 80. A central web 140 is attached to the hub 134 and at the outer periphery thereof is provided with laterally extending rims 142. The rims 142 are provided with a plurality of rows of threaded apertures 144 herein shown as two rows one on each side of the web 140. Ground engaging calks 146 having a threaded body 148 threadedly engages the threaded openings 144. The calk 146 is provided with a wrench engaging portion of square or hexagonal shape 150 and the inner end of the body 148 is provided with a square or hexagonal wrench engaging face 152. Preferably the calk 146 is provided with a core of extremely hard metal while the outer shell-like portion is of soft more tenacious material. This provides a soft crust in which there will be a hard central core for penetration into the street or other material on which the vehicle may be progressing so as to secure positive contact therewith.

The ends 72 and 74 of the U-shaped frame 60 are provided with apertures 160 through which extends a threaded shank 162 of cutter stems 164 bearing substantially conical cutter heads 166 which are arranged in substantial alignment with and adjacent to the surfaces of calks 146 for cutting mud, ice, tar or other material out of the calks. A threaded shank of the cutter stems 164 are secured to the ends of the U-shaped frame by means of nuts 168 and 170 so that in the event of breaking the threaded shafts may be easily removed from the frame 60.

Frames 44 and 60 are oscillated about the axis defined by the pivot pins 38 and 40 by means of cylinders 180 and 182. The cylinders 180 and 182 are provided with ball ends 184 and 186 which are received in sockets 188 and 190 mounted on the frame 10 of the vehicle. The cylinders 180 and 182 are provided with the usual pistons 192 which extend piston rods 194 and 196, the piston rod 194 being provided with a ball and socket joint 198 which is connected to the end of the U-shaped member 60 while the piston rod 196 is provided with a ball and socket joint 200 which is connected to the ends 74 of the U-shaped bracket 60.

Figure 3:
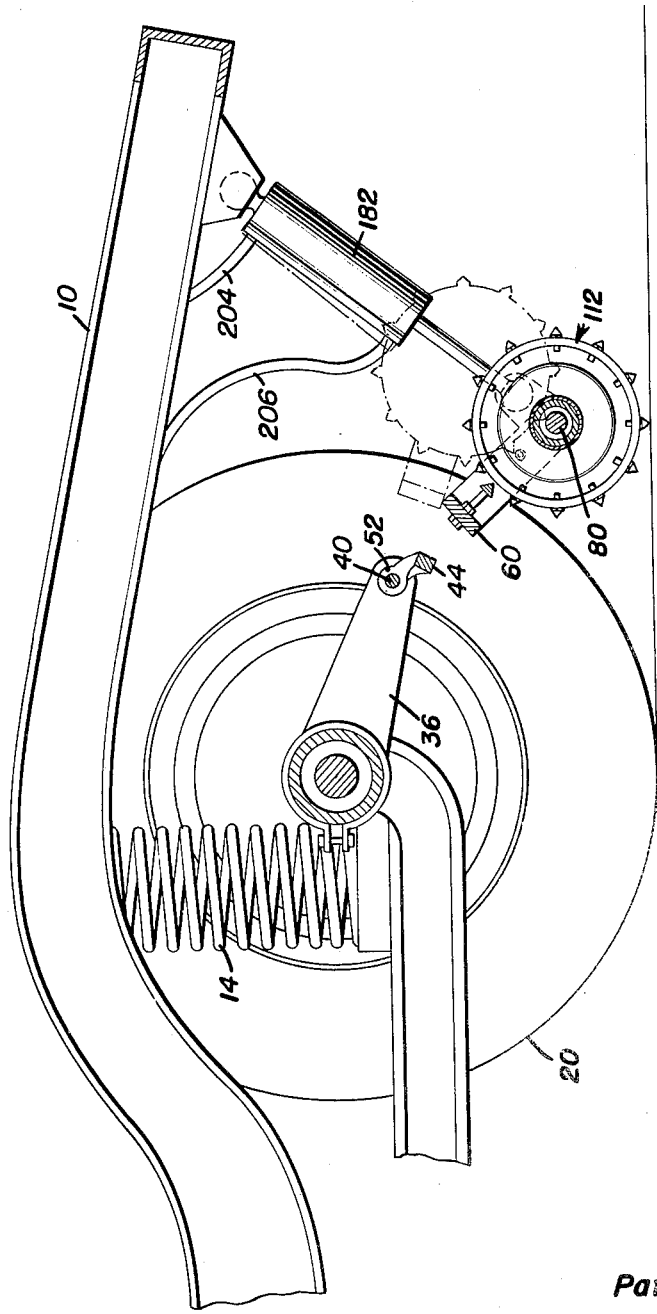
Figure 3 is a cross-section showing the ground contact mechanism and taken substantially on the plane indicated by the line 3—3 of Figure 1.

Cylinders 180 and 182 are provided with fluid connections 204 and 206 so that fluid may be admitted at either end thereof to expel or retract the pistons 194 and 196. By expelling the pistons 194 and 196 the U-shaped frame 60 and the frame 44 can be oscillated about the axis of the pivot pins 38 and 40 to push the wheels 110 and 112 into contact with the ground. Also by retracting the pistons 194 and 196 frames 44 and 60 may be retracted so that the wheels 110 and 112 are removed from contact with the ground as clearly shown in Figure 3.

Each of the wheels 110 and 112 is provided with a brake drum 210 and 212. The drum 210 is covered by a housing 214 and the drum 212 is covered by housing 216. The housings 214 and 216 are firmly secured on the ends of the shaft housing and have mounted therein by means of studs 218 brake shoes 220. The brake shoes 220 are forced into engagement with the brake drum 212 by means of pressure cylinders 222 which are supplied with fluid by means of a conduit 224.

It will thus be seen that there has been provided an auxiliary equipment which may be raised or lowered at will from contact with the ground by admitting fluid under pressure to either end of the cylinders 180 and 182. The ground engaging wheels 110 and 112 are in driving engagement with the main wheels 18 and 20 by means of a drive shaft 88 and the gearing connected therewith. Thus it will be seen that if the vehicle is incapable of motion over a slippery surface the auxiliary wheels may be lowered into contact with the slippery surface and because of the calks therein will make firm engagement therewith. The auxiliary driving wheels will then propel the vehicle over the slippery surface. It will be obvious that by firm engagement with the pavement either of muddy or icy condition or other conditions such as a wet asphalt pavement the calks will make firm contact to prevent excessive slipping or side play of the vehicle and see that it is propelled definitely along the route. Likewise, the brakes between the housings 120 and 122 and the wheels 110 and 112 may be utilized to strictly stop the vehicle in any condition. In emergency the frames 44 and 60 may be expelled against the ground and the brakes applied to stop the vehicle. Also on slippery pavements the brakes may likewise be used to make firm contact with the ground and stop the vehicle in a reasonable distance.

It will also be seen that the present attachment can be applied to vehicles with a minimum of disturbance of the parts thereof. The brackets 188 and 190 can be readily welded to the underneath portion of the frame 10 while the brackets 30, 32, 34 and 36 may be readily bolted on the housing 12. The normal cover plate of the housing 22 is removed and the special cover plate 100 attached so that the gear 90 makes contact with the normal driving gear in the housing all without disturbing the original arrangement.

For a purpose of exemplification a particular embodiment of the invention has been shown, and described according to the best present understanding thereof, it will be apparent to those skilled in the art, that many changes and modifications can be made therein without departing from the true spirit of the invention.

Having described the invention, what is claimed as new is:

1. In a vehicle having a vehicle frame and a rear axle housing, an auxiliary ground engaging member comprising a plurality of brackets mounted on the rear axle housing, a first frame journaled on said brackets for oscillation about an axis parallel to said housing, a hollow shaft extending through said first frame, a U-shaped frame mounted on said hollow shaft and journaled for oscillation about an axis perpendicular to said housing, means connected between said vehicle frame and said U-shaped frame for oscillating said first frame about said parallel axis, ground engaging wheels journaled in said U-shaped frame, brake means operatively engaging said ground engaging wheels.

2. In a vehicle having a vehicle frame and a rear axle housing, an auxiliary ground engaging member comprising a plurality of brackets mounted on the rear axle housing, a first frame journaled on said brackets for oscillation about an axis parallel to said housing, a hollow shaft fixed on said first frame in perpendicular relation to said first mentioned axis, a U-shaped frame journaled on said hollow shaft for oscillation about an axis perpendicular to said housing, means connected between said vehicle frame and said U-shaped frame for oscillating said first frame about said parallel axis, an axle journaled in said U-shaped frame, ground engaging wheels fixed on said axle, brake means operatively associated with said ground-engaging wheels.

3. In a vehicle having a vehicle frame and a rear axle housing, an auxiliary ground engaging member comprising a plurality of brackets mounted on the rear axle housing, a first frame journaled on said brackets for oscillation about an axis parallel to said housing, a bushing secured centrally of said first frame, a hollow shaft fixed in said bushing, a U-shaped frame journaled on said hollow shaft for oscillation about an axis perpendicular to said housing, means connected between said vehicle frame and said U-shaped frame for oscillating said first frame about said parallel axis, an axle journaled in said U-shaped frame, ground engaging wheels on said axle, brake means operatively associated with said wheels, calks mounted in the ground engaging surface of said wheels, cleaning cutters mounted on said U-shaped frame and extending adjacent said calks.

4. In a vehicle having a vehicle frame and a rear axle housing, an auxiliary ground engaging member comprising a plurality of brackets moutned on the rear axle housing, a first frame journaled on said brackets for oscillation about an axis parallel to said housing, a hollow shaft fixed in said first frame and extending perpendicular to said first mentioned axis, a U-shaped frame journaled on said hollow shaft for oscillation about an axis perpendicular to said housing, a plurality of fluid operated cylinders connected between the frame of said vehicles and said U-shaped frame for determining the position of said U-shaped frame with respect to said axle housing, a shaft journaled in said U-shaped frame, a plurality of ground engaging wheels secured on said shaft, brake means operatively associated with each of said wheels.

5. In a vehicle having a frame, a rear axle housing, axles in said axle housing and gear means for driving said axles, a frame journaled for oscillation about an axis parallel to said housing, a hollow shaft fixed in transverse relation to said frame a U-shaped frame journaled on said hollow shaft, a shaft journaled in said U-shaped frame, a plurality of wheels secured on said shaft, a housing about said shaft, anchor means securing said shaft housing in rigid non-rotative relation to said U-shaped frame, brake means interposed between said shaft housing and said wheels, a plurality of fluid actuated cylinders connected between said vehicle frame and said U-shaped frame for selectively positioning said U-shaped frame.

6. In a vehicle having a frame, a rear axle housing, axles in said axle housing and gear means for driving said axles, a frame journaled for oscillation about an axis parallel to said housing, a transverse shaft mounted on said oscillating frame a U-shaped frame journaled on said transverse shaft, a shaft journaled in said U-shaped frame, a plurality of wheels secured on said shaft, a housing about said shaft, anchor means securing said shaft housing in rigid non-rotative relation to said U-shaped frame, brake means interposed between said shaft housing and said wheels, a plurality of fluid actuated cylinders connected between said vehicle frame and said U-shaped frame for selectively positioning said U-shaped frame, a plurality of circumferential rows of calks mounted on the outer surface of each of said wheels, a plurality of cleaning cutters mounted on said U-shaped frame and extending between said rows of calks.

7. In a vehicle having a frame, a rear axle housing, axles in said axle housing and gear means for driving said axles, a frame journaled for oscillation about an axis parallel to said housing, a U-shaped frame journaled for oscillation about an axis transverse to said oscillating frame, a shaft journaled in said U-shaped frame, a plurality of wheels secured on said shaft, a housing about said shaft, anchor means securing said shaft housing in rigid non-rotative relation to said U-shaped frame, brake means interposed between said shaft housing and said wheels, a plurality of fluid actuated cylinders connected between said vehicle frame and said U-shaped frame for selectively positioning said U-shaped frame, a plurality of circumferential rows of calks mounted on the outer surface of each of said wheels, each of said calks having a central core of hard metal and an outer sheath of softer metal.

8. In a vehicle having a frame, a rear axle housing, axles in said axle housing and gear means for driving said axles, a frame journaled for oscillation about an axis parallel to said housing, a hollow shaft fixed on said oscillating frame a U-shaped frame journaled on said hollow shaft, a shaft journaled in said U-shaped frame, a plurality of wheels secured on said shaft, a housing about said shaft, anchor means securing said shaft housing in rigid non-rotative relation to said U-shaped frame, a brake drum secured on each of said wheels, brake shoes mounted on said shaft housing and engaging said brake drums, and means for controlling the pressure between said shoes and said drum.

9. In a vehicle having a frame, a rear axle housing, axles in said axle housing and gear means for driving said axles, a frame journaled for oscillation about an axis parallel to said housing, a hollow shaft fixed in said oscillating frame perpendicular to said axis, a U-shaped frame journaled on said hollow shaft, a shaft journaled in said U-shaped frame, a plurality of wheels secured on said shaft, a housing about said shaft, anchor means securing said shaft housing in rigid non-rotative relation to said U-shaped frame, brake means interposed between said shaft housing and said wheels, each of said wheels including a central web, a rim secured on and extending laterally from said web, a peripheral row of threaded openings, calks having threaded shanks mounted in said threaded openings, wrench engaging portions at each end of said threaded shanks.

PATRICK DURKIN.

References Cited in the file of this patent

UNITED STATES PATENTS

| Number | Name | Date |
|---|---|---|
| 520,278 | Wehrenberg | May 22, 1894 |
| 1,445,562 | Shinn | Feb. 13, 1923 |
| 1,476,716 | Kalman | Dec. 11, 1923 |
| 1,539,476 | Gormly | May 26, 1925 |
| 1,837,946 | Bosch | Dec. 22, 1931 |
| 1,974,773 | Garigliano et al. | Sept. 25, 1934 |
| 2,062,931 | Raffa | Dec. 1, 1936 |
| 2,544,774 | Bredl et al. | Mar. 13, 1951 |